United States Patent Office 3,329,684
Patented July 4, 1967

3,329,684
ISOINDOLOBENZIMIDAZOLONES
William J. Houlihan, Mountain Lakes, N.J., assignor to Sandoz Inc., Hanover, N.J.
No Drawing. Filed July 1, 1964, Ser. No. 379,749
10 Claims. (Cl. 260—309.2)

ABSTRACT OF THE DISCLOSURE

The compounds are 4a-substituted-isoindolo-5H-[1,2-b]benzimidazol-11-ones useful as sedatives and tranquilizers. They are prepared by reacting an o-acylbenzoic acid with an o-phenylenediamine.

---

This invention provides three classes of compounds which are generically represented by the formula

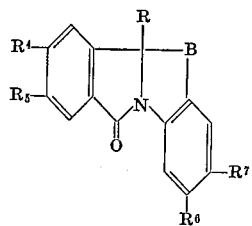

(I)

wherein

R is either lower alkyl, e.g. methyl, ethyl, propyl, isopropyl and butyl; or

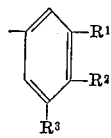

each of $R^1$, $R^2$, $R^3$, $R^4$ and $R^5$ is, independently, either a hydrogen atom (—H); lower alkyl, e.g. methyl, ethyl, propyl, isopropyl and butyl; lower alkoxy, e.g. methoxy, ethoxy, propoxy, isopropoxy and butoxy; primary amino (—NH$_2$); a chlorine atom (—Cl); a bromine atom (—Br); a fluorine atom (—F); or trifluoromethyl (—CF$_3$), with the proviso that a plurality of trifluoromethyl groups are not ortho to each other;

each of $R^6$ and $R^7$ is, independently, either a hydrogen atom (—H); a fluorine atom (—F); a chlorine atom (—Cl); —SR$^8$; —OR$^8$; lower alkyl, e.g. methyl, ethyl, propyl, isopropyl and butyl; and trifluoromethyl (—CF$_3$), with the proviso that both $R^6$ and $R^7$ are not trifluoromethyl in the same compound;

$R^8$ is lower alkyl, e.g. methyl, ethyl, propyl, isopropyl and butyl; and

B is=NH for the first class of compounds;
  is=O for the second class of compounds; and
  is=S for the third class of compounds.

The compounds of this invention are prepared by admixing and heating an o-acylbenzoic acid (II) with an o-(HB—)substituted aniline (III) in an inert solvent with an acid catalyst according to the reaction scheme:

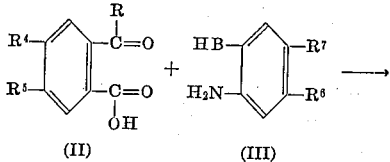

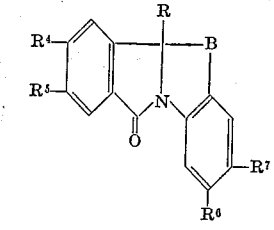

(I)

wherein each of R, $R^4$, $R^5$, $R^6$, $R^7$ and B has its above-ascribed meaning, as it does throughout the entire disclosure.

The inert solvent is one which is inert, at the reaction temperature, with both the reactants and the reaction product. Suitable solvents are polar solvents, e.g. dimethylformamide, diethylformamide, dioxane, chlorobenzene and pyridine; benzenes, e.g. benzene, toluene, dichlorobenzene; cycloalkanes, e.g. cyclohexane; and other high-boiling hydrocarbons, e.g. tetralin.

The temperature at which the reaction is effected is any temperature from room temperature (20° C.) to the boiling point of the selected solvent system.

The acid catalyst is either an organic acid or an inorganic acid. Para-toluenesulfonic acid is preferred, but other acids, such as alkane sulfonic, e.g. methane sulfonic; arylsulfonic, e.g. phenylsulfonic; phosphoric; acid ion exchange resin, e.g. "Dowex–50"; and acid activated aluminosilicates, e.g. "Tonsil," also produce favorable results.

Compounds of this invention are stable compounds useful as sedatives, tranquilizers and antidepressants. They are administered either orally or parenterally in daily doses from two hundred milligrams to four hundred milligrams. Compounds of this invention are CNS (central nervous system) active and antagonize amphetamine's CNS activity.

The examples are merely illustrative of the invention. Any contemplated combination of substitution within the scope of Formula I is obtained in the same manner as hereinafter set forth by the corresponding selection of reactants. Corresponding compounds of the first, second and third classes of compounds are prepared in the same manner with only an appropriate change in reactant III.

In said examples, unless otherwise specified, all parts are parts by weight, all temperatures are in degrees centigrade, and the relationship between parts by weight and parts by volume is the same at that between the kilogram and the liter.

EXAMPLE 1

4a-phenyl-isoindolo-5H-[1,2-b]benzimidazol-11-one

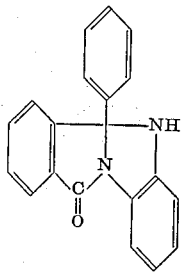

Admix in a flask equipped with a stirrer and a Dean-Stark tube (for removing water) 22.6 parts (0.10 mole) of o-benzoylbenzoic acid, 16.2 parts (0.15 mole) of o-phenylenediamine, 0.2 part of p-toluene sulfonic acid and 350 parts by volume of toluene. Stir and reflux the obtained mixture until water ceases to separate in the Dean-Stark tube. Remove the solvent in vacuo in a rotary evaporator. Add the oily residue to methanol to obtain light yellow solid. Recrystallize from ethanol-water to obtain 19.6 parts of the title compound, melting point (M.P.) 158°.

In this example o-benzoylbenzoic acid is used as the Compound II and o-phenylenediamine, as the Compound III. The example is repeated to obtain corresponding compounds with comparable results replacing said Compounds II and III as follows:

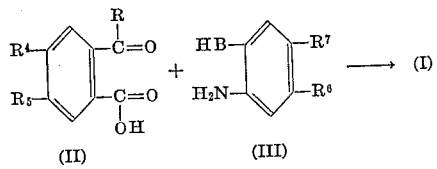

a rotary evaporator. Recrystallize from methanol to obtain 3.3 parts of title compound, M.P. 233° to 235°.

By replacing the o-acetylbenzoic acid (II) and the 4-chloro-o-phenylene diamine (III) by their counterparts defined by substituents in the following table, comparable results and corresponding compounds are obtained.

|     | R    | $R^4$ | $R^5$  | $R^6$  | $R^7$ | >B   |
|-----|------|-------|--------|--------|-------|------|
| (a) | —Me  | —H    | —H     | —H     | —H    | >O   |
| (b) | —Et  | —Bu   | —Cl    | —F     | —Me   | >S   |
| (c) | —Pr  | —O—Me | —iPr   | —H     | —Cl   | >NH  |
| (d) | —iPr | —Me   | —O—Et  | —S—Me  | —H.   | >O   |
| (e) | —Bu  | —CF₃  | —Et    | —CF₃   | —S—Et | >S   |

|     | R | $R^4$ | $R^5$ | $R^6$ | $R^7$ | B |
|-----|---|-------|-------|-------|-------|---|
| (a) | phenyl | —H | —H | —S—iPr | —O—Bu | >NH |
| (b) | 4-CH₃-phenyl | —H | —H | —O—iPr | —H | >S |
| (c) | 3-O—Bu, 5-Et-phenyl | —H | —Cl | —H | —O—Bu | >NH |
| (d) | 4-Br-phenyl | —Pr | —H | —O—Me | —O—Et | >O |
| (e) | 4-F-phenyl | —H | —iPr | —Et | —CF₃ | >S |
| (f) | 3-Bu, 5-Cl-phenyl | —Me | —O—iPr | —Me | —Pr | >NH |
| (g) | 3-NH₂, 5-O—Me-phenyl | —H | —Et | —iPr | —H | >O |
| (h) | 3-O—Et, 5-CF₃-phenyl | —H | —H | —Cl | —Bu | >S |
| (i) | 3-CF₃, 4-NH₂, 5-CF₃-phenyl | —O—Pr | —H | —F | —F | >O |

Where Me is methyl, Et is ethyl, Pr is propyl, iPr is isopropyl, and Bu is butyl.

EXAMPLE 2

*4a-methyl-8-chloro-isoindolo-5H-[1,2-b]benzimidazol-11-one*

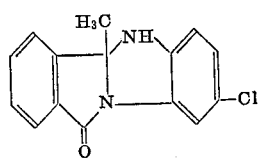

Admix in a flask equipped with a stirrer and a Dean-Stark tube (for removing water) 8.2 parts (0.05 mole) of o-acetylbenzoic acid, 14.3 parts (0.10 mole) of 4-chlorophenylene diamine, 250 parts by volume of xylene and .03 part of p-toluenesulfonic acid. Stir and reflux the obtained mixture until water ceases to separate in the Dean-Stark tube. Remove the solvent in vacuo in

EXAMPLE 3

*4a-phenyl-8-chloro-isoindolo-5H-[1,2-b]benzimidazol-11-one*

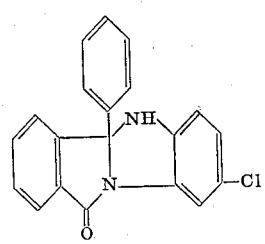

Admix in a flask equipped with a stirrer and a Dean-Stark tube 11.3 parts (0.05 mole) of o-benzoylbenzoic acid, 10.0 parts (0.07 mole) of 4-chloro-o-phenylenediamine, 0.5 part of p-toluenesulfonic acid and 250 parts by volume of toluene. Stir and reflux the obtained mixture until water ceases to separate in the Dean-Stark tube. Remove the solvent in vacuo in a rotary evaporator. Add the oily residue to methanol to obtain a light yellow solid. Recrystallize from DMF-methanol-water to obtain 5.3 parts of the title compound, M.P. 210° to 211°.

EXAMPLE 4

4a-(p-tolyl)-8-chloro-isoindolo-5H-[1,2-b]benzimidazol-11-one

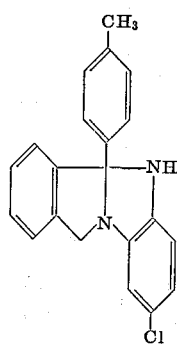

Admix in a flask equipped with a stirrer and a Dean-Stark tube 12.0 parts (0.05 mole) of o-(p-tolyl)-benzoic acid, 10.0 parts (0.07 mole) of 4-chloro-o-phenylene diamine, 0.5 part of p-toluene-sulfonic acid and 250 parts by volume of toluene. Stir and reflux the obtained mixture until water ceases to separate in the Dean-Stark tube. Remove the solvent in vacuo in a rotary evaporator. Add the oily residue to methanol to obtain a light yellow solid. Recrystallize from DMF-methanol-water to obtain 9.1 parts of the title compound, M.P. 210° to 212°.

EXAMPLE 5

4a-(p-chlorophenyl)-8-chloro-isoindolo-5H-[1,2-b]benzimidazol-11-one

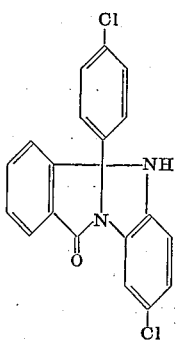

Admix in a flask equipped with a stirrer and a Dean-Stark tube 13.0 parts (0.05 mole) of o-(p-chlorobenzoyl)-benzoic acid, 10.0 parts (0.07 mole) of 4-chloro-o-phenylene diamine, 250 parts by volume of toluene, and 0.5 part of p-toluenesulfonic acid. Stir and reflux the obtained mixture until water ceases to separate in the Dean-Stark tube. Remove the solvent in vacuo in a rotary evaporator. Add the oily residue to methanol to obtain a light yellow solid. Recrystallize from DMF-methanol-water to obtain 8.0 parts of the title compound, M.P. 184° to 185°.

EXAMPLE 6

4a-phenyl-8-methoxy-isoindolo-5H-[1,2-b]benzimidazol-11-one

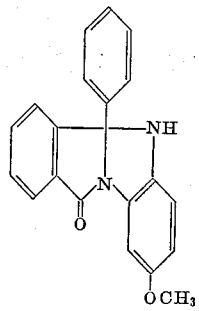

Admix in a flask equipped with a stirrer and a Dean-Stark tube 3.5 parts (0.015 mole) of o-benzoylbenzoic acid, 3.0 parts (0.022 mole) of 4-methoxy-o-phenylenediamine, 0.2 part of p-toluenesulfonic acid and 75 parts by volume of toluene. Stir and reflux the obtained mixture until water ceases to separate in the Dean-Stark tube. Remove the solvent in vacuo in a rotary evaporator. Add the oily residue to methanol to obtain a light yellow solid. Recrystallize from DMF-water to obtain 4.7 parts of the title compound, M.P. 108° to 111°.

EXAMPLE 7

4a-methyl-isoindolo-5H-[1,2-b]benzimidazol-11-one

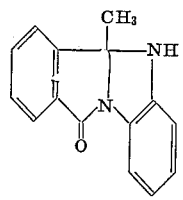

Admix in a flask equipped with a stirrer and a Dean-Stark tube 4.1 parts (0.025 mole) of o-acetylbenzoic acid, 5.4 parts (0.050 mole) of o-phenylene diamine, 150 parts by volume of toluene and 0.1 part of p-toluene sulfonic acid. Stir and reflux the obtained mixture until water ceases to separate in the Dean-Stark tube. Remove the solvent in vacuo in a rotary evaporator. Add the oily residue to methanol to obtain a light yellow solid. Recrystallize from i-propanol to obtain 3.1 parts of the title compound, M.P. 183° to 184°.

EXAMPLE 8

4a-(p-chlorophenyl)-8-methoxy-isoindolo-5H-[1,2-b]benzimidazol-11-one

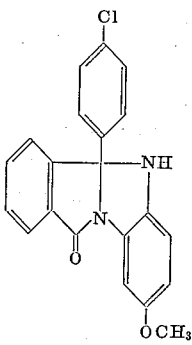

Admix in a flask equipped with a stirrer and a Dean-Stark tube 6.8 parts (0.026 mole) of o-(p-chlorobenzoyl)-benzoic acid, 5.0 parts (0.036 mole) of 4-methoxy-o-phenylene diamine, 150 parts by volume of toluene and 0.3 part of p-toluenesulfonic acid. Stir and reflux the obtained mixture until water ceases to separate in the Dean-Stark tube. Remove the solvent in vacuo in a rotary

EXAMPLE 9

*4a-phenyl-isoindolo[1,2-b]benzoxazol-11-one*

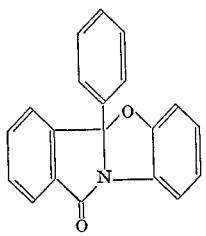

Admix in a flask equipped with a stirrer and a Dean-Stark tube 11.3 parts (0.05 mole) of o-benzoylbenzoic acid, 8.2 parts (0.075 mole) of o-aminophenol, 0.2 part of p-toluenesulfonic acid and 150 parts by volume of toluene. Stir and reflux the obtained mixture until water ceases to separate in the Dean-Stark tube. Remove the solvent in vacuo in a rotary evaporator. Add the oily residue to methanol to obtain a light yellow solid. Recrystallize from methanol-water to obtain 8.6 parts of the title compound, M.P. 125° to 128°.

EXAMPLE 10

*4a-phenyl-isoindolo[1,2-b]benzothiazol-11-one*

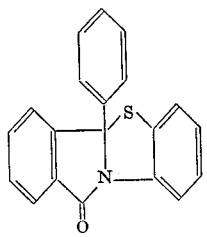

Admix in a flask equipped with a stirrer and a Dean-Stark tube 11.3 parts (0.05 mole) of o-benzoylbenzoic acid, 8.8 parts (0.07 mole) of o-aminothiophenol, 200 parts by volume of technical o-dichlorobenzenes and 0.5 part of p-toluenesulfonic acid. Stir and reflux the obtained mixture until water ceases to separate in the Dean-Stark tube. Remove the solvent in vacuo in a rotary evaporator. Add the oily residue to methanol to obtain a light yellow solid. Recrystallize from chloroform-ether to obtain 11.1 parts of the title compound, M.P. 144° to 148°.

It is thought that the invention will be understood from the foregoing description and it is apparent that various changes may be made in the products without departing from the spirit and scope of the invention or sacrificing its material advantages, the compounds hereinbefore described being merely illustrative of embodiments of the invention.

What is claimed is:

1. A compound of the formula

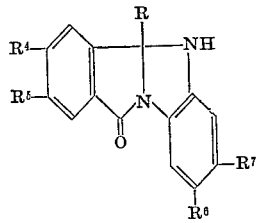

wherein
R is lower alkyl;
each of $R^4$ and $R^5$ is a member selected from the group consisting of a hydrogen atom, lower alkyl, lower alkoxy, primary amino, a chlorine atom, a bromine atom, a fluorine atom and trifluoromethyl, with the proviso that at most one of $R^4$ and $R^5$ is trifluoromethyl; and
each of $R^6$ and $R^7$ is a member selected from the group consisting of a hydrogen atom, a fluorine atom, a chlorine atom, lower alkylthio, lower alkoxy, lower alkyl and trifluoromethyl, with the proviso that at most one of $R^6$ and $R^7$ is trifluoromethyl.

2. 4a-methyl-8-chloro-isoindolo-5H - [1,2-b]benzimidazol-11-one.
3. 4a-methyl-isoindolo-5H-[1,2-b]benzimidazol-11-one.
4. A compound of the formula

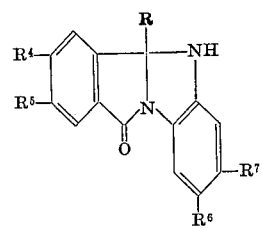

wherein
R is 3-$R^1$-4-$R^2$-5-$R^3$-phenyl;
each of $R^1$, $R^2$, $R^3$, $R^4$ and $R^5$ is a member selected from the group consisting of a hydrogen atom, lower alkyl, lower alkoxy, primary amino, a chlorine atom, a bromine atom, a fluorine atom and trifluoromethyl, with the proviso that a plurality of trifluoromethyl groups are not ortho to each other; and
each of $R^6$ and $R^7$ is a member selected from the group consisting of a hydrogen atom, a fluorine atom, a chlorine atom, lower alkylthio, lower alkoxy, lower alkyl and trifluoromethyl, with the proviso that at most one of $R^6$ and $R^7$ is trifluoromethyl.

5. 4a-phenyl-isoindolo-5H-[1,2-b]benzimidazol-11-one.
6. 4a-phenyl-8-chloro-isoindolo-5H - [1,2-b]benzimidazol-11-one.
7. 4a-(p-tolyl)-8-chloro-isoindolo-5H - [1,2-b]benzimidazol-11-one.
8. 4a-(p-chlorophenyl)-8-chloro-isoindolo-5H - [1,2-b]benzimidazol-11-one.
9. 4a-phenyl-8-methoxy-isoindolo-5H - [1,2-b]benzimidazol-11-one.
10. 4a-(p-chlorophenyl)-8-methoxy-isoindolo-5H - [1,2-b]benzimidazol-11-one.

No references cited.

ALEX MAZEL, *Primary Examiner.*

RICHARD J. GALLAGHER, *Assistant Examiner.*